United States Patent [19]

Beavers et al.

[11] Patent Number: 4,508,583

[45] Date of Patent: Apr. 2, 1985

[54] METHOD OF RECLAIMING ELECTRIC MOTOR LAMINATIONS

[75] Inventors: John A. Beavers; Willard F. North, both of Claremore, Okla.

[73] Assignee: Hughes Tool Company, Houston, Tex.

[21] Appl. No.: 612,974

[22] Filed: May 23, 1984

[51] Int. Cl.³ ............................................. B32B 35/00
[52] U.S. Cl. ................................. 156/94; 29/402.04; 156/155; 156/344
[58] Field of Search ............. 29/402.03, 402.04, 426.1; 156/94, 155, 344; 310/254

[56] References Cited

U.S. PATENT DOCUMENTS

| | | | |
|---|---|---|---|
| 1,608,350 | 11/1926 | Waller . | |
| 2,174,451 | 9/1939 | Strange | 294/96 |
| 2,939,209 | 6/1960 | Schwartz | 29/402.04 X |
| 3,256,590 | 6/1966 | Myers | 29/155.5 |
| 3,401,446 | 9/1968 | Obeda et al. | 156/344 X |
| 3,851,758 | 12/1974 | Makhijani et al. | 156/155 X |
| 3,951,727 | 4/1976 | Greenberg | 156/584 |
| 4,016,639 | 4/1977 | Dombrowski et al. | 29/762 |
| 4,226,659 | 10/1980 | Griffith et al. | 156/155 X |

Primary Examiner—Robert A. Dawson
Attorney, Agent, or Firm—Robert A. Felsman; James E. Bradley

[57] ABSTRACT

A method of reclaiming laminations from electric motors enables reclamation with epoxy filled stators. The stator is removed from the housing and placed on a support in clamps. One clamp is moved with respect to the other to separate a section of the stator from the remaining portions of the stator. This also pulls windings from the separated section. The stator is then reclamped and another section is pulled from the stator. When broken into individual sections free of windings, the epoxy filler can be loosened either chemically, or by heat, or by heat and quenching.

5 Claims, 3 Drawing Figures

METHOD OF RECLAIMING ELECTRIC MOTOR LAMINATIONS

BACKGROUND OF THE INVENTION

1. Field of the Invention

This invention relates in general to a method of reclaiming electric motor laminations, particularly for submersible pump motors having windings encased in epoxy.

2. Description of the Prior Art

Submersible pump electric motors are AC motors having diameters of only a few inches, but lengths up to and exceeding 30 feet. The components of such a motor include a stator stationarily mounted inside a housing. The stator contains windings through which voltage is imposed. A rotor is mounted within the stator for rotating a shaft in response to the current passing through the stator.

The stator is composed of a large number of thin, flat disks called laminations. These laminations are of a metallic material and have slots through them for wires or windings to pass. When a voltage is imposed onto the stator, the winding is excited and tends to vibrate at the frequency of imposed power source. If some means is not used to prevent movement of the wire, the resulting vibration will cause wear in the wire insulation and a wire to wire or wire to ground fault will occur.

It is customary that the stator windings be encapsulated within a material that will hold them firmly to prevent vibration. The encapsulating material must be able to withstand whatever environment in which the motor is placed. Also, the encapsulating material must have a good dialectric properties. Various materials which have been used include varnishes and epoxies.

Varnishes accomplish the desired purpose of firmly holding the windings, but due to the low viscosity of varnish, and the evaporation of solvents during the curing cycle, many voids or open spaces are left in the slots of the stator. Expoxies are more viscous and have less solvents that must escape during a curing process, so the slot voids are essentially filled with cured epoxy.

When a winding fault occurs, the laminations of the stator are usually not damaged. It is, therefore, desirable that the damaged windings be removed and the laminations reused. If the encapsulating material is varnish, there are many solvents that are useful in dissolving varnish, allowing the windings to be easily withdrawn. Many void places exist in the slots, which permit entrance of the solvent or solvent vapors. However, if the encapsulating material is epoxy, the slots are virtually full and only a small area of the epoxy is exposed to a solvent. The amount of exposed epoxy is too small to prevent destruction of the epoxy sufficient to allow withdrawal of the windings. Epoxy also forms a mechanical bond to the windings and the laminations, and the windings are not sufficiently strong to allow pulling on the windings and removal of the windings from the stator. Consequently, the laminations in epoxy filled stators are not reclaimed.

SUMMARY OF THE INVENTION

In this invention, a method is provided for reclaiming the laminations of a stator, even if the windings have been encapsulated with epoxy filler. The method includes removing the stator from the motor housing in a conventional manner. The stator is then placed on a support which has two grippers or clamps, one of which is movable relative to the other. After clamping, one clamp is moved axially away from the other clamp, breaking apart a section of the laminations and pulling windings from the separated section. Then, the stator is reclamped and the clamps are again moved apart to break apart another section. This process is repeated until the stator is broken into a number of small sections, which have had the windings pulled from them.

Once the windings have been removed, this leaves only residual filler, which is now exposed. The residual filler can be removed by a solvent, or by heat. The separated sections can be heated to a temperature and for a time sufficient to crystallize the filler, allowing it to be broken apart. Also, the filler can be heated to a lower temperature, then quenched quickly to cause it to break its bond with the laminations.

BRIEF DESCRIPTION OF THE DRAWINGS

FIG. 3 is a vertical sectional view of a portion of a submersible pump electric motor.

DESCRIPTION OF THE PREFERRED EMBODIMENT

Figure 1:
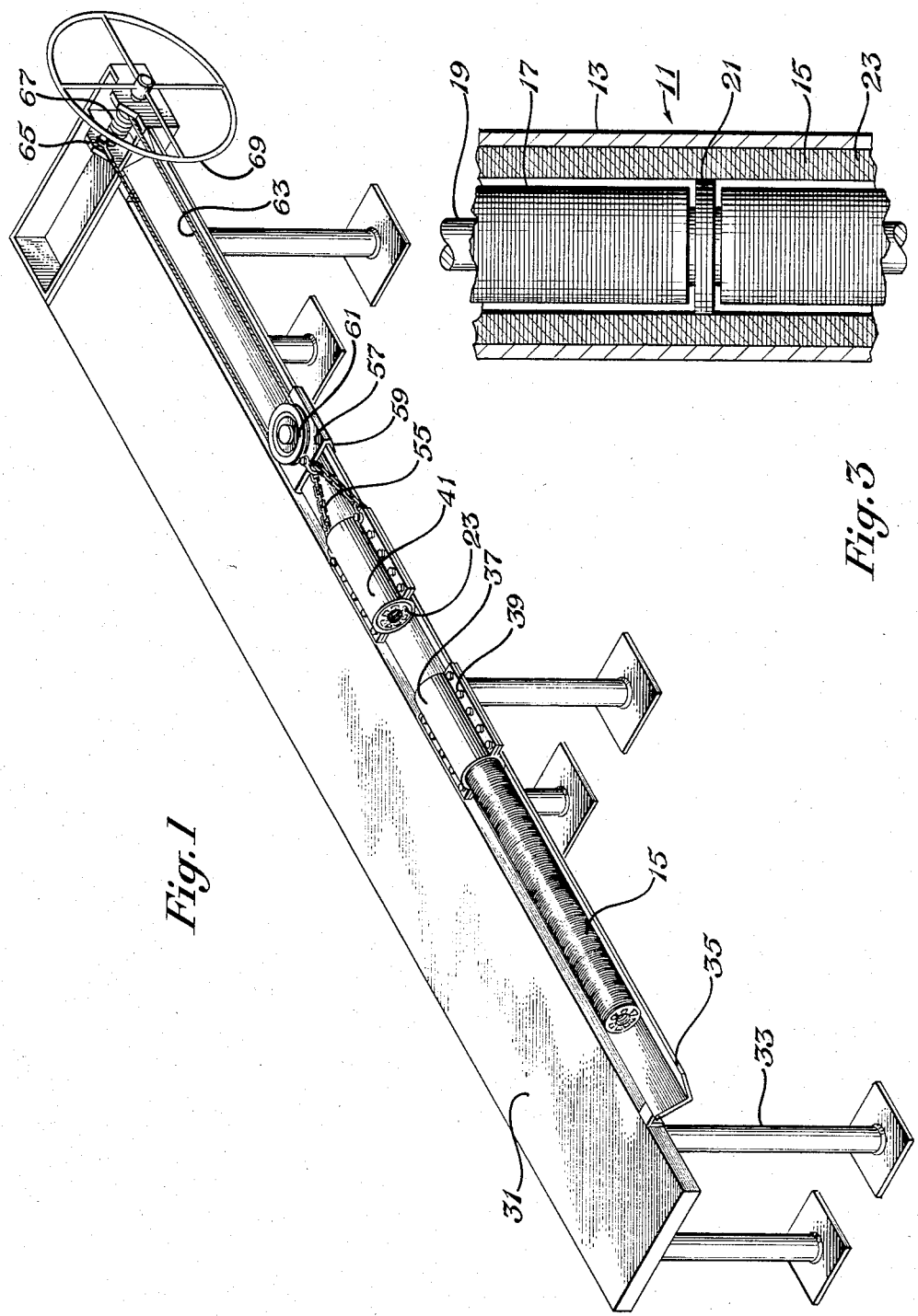
FIG. 1 is a perspective view showing an apparatus for performing the method of this invention.

Referring to FIG. 3, a submersible pump electric motor 11 includes a cylindrical housing 13. Housing 13 is elongated, with a diameter from about 3¾ to 7 inches and a length from about 4 to 32 feet. A stator 15 is stationarily mounted inside housing 13 by a conventional means. A rotor 17 is rotatably mounted within the inner diameter of stator 15 for driving a shaft 19. Bearings 21 are located along the length of the rotor 17 for supporting the shaft 19.

Figure 2:
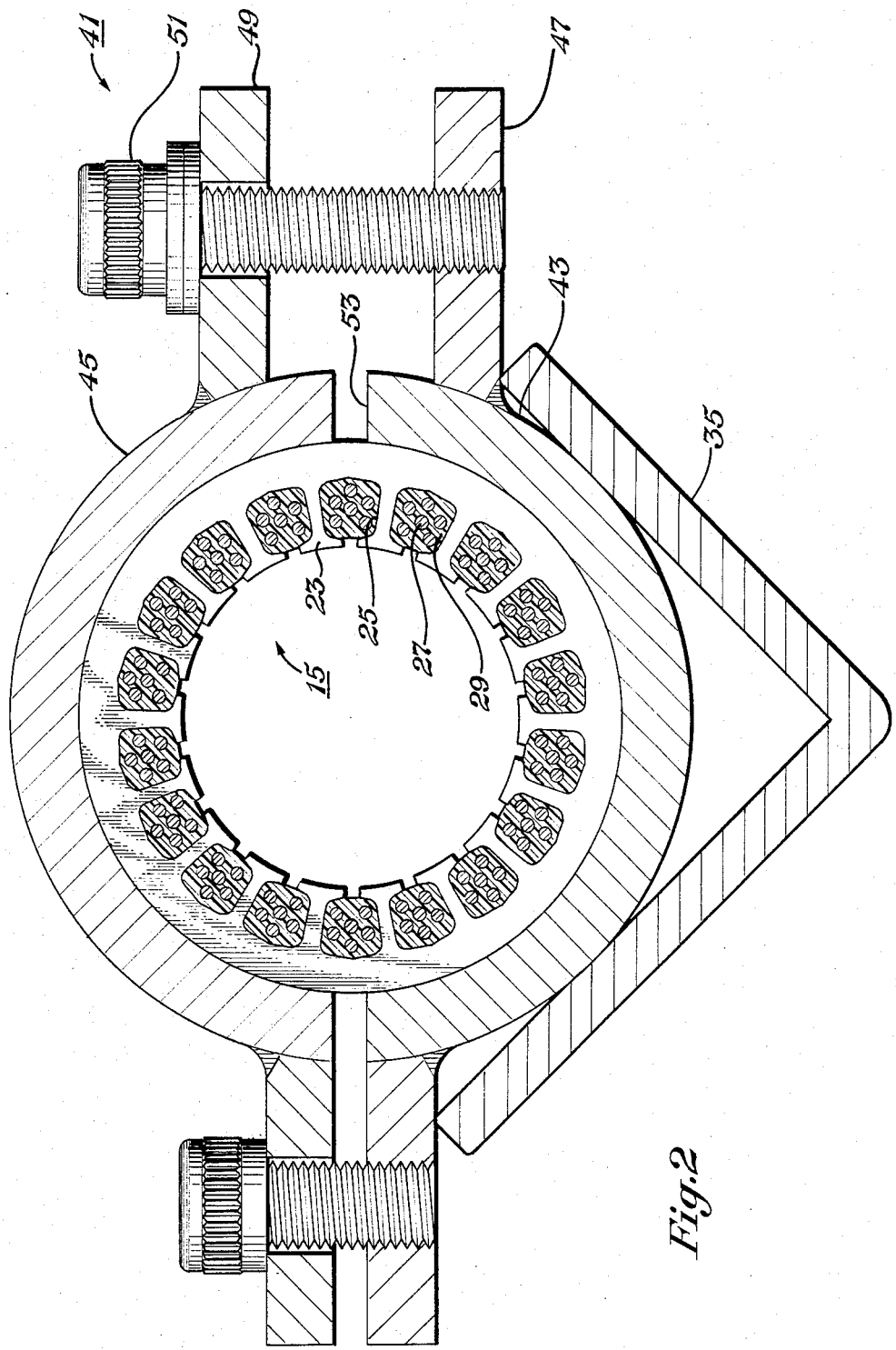
FIG. 2 is an enlarged vertical sectional view of the movable clamp of the apparatus of FIG. 1.

Referring to FIG. 2, the stator 15 is comprised of a large number of laminations 23. Each lamination 23 is a flat, metal disk containing slots 25 spaced in a circular array. Most of the laminations 23 are steel and are located in sections about 13 inches long. These sections are separated by short sections of bronze laminations 23, which coincide with each bearing 21. The slots contain a liner (not shown), which is preferably a wrap of about three layers of an insulating material. The magnent wire or windings 27 are wound through the liner in the slots 25 and connected together at one end, normally a three phase connection. The windings 27 are insulated from each other and are encapsulated within a filler 29 that is preferably epoxy. Epoxy 29 is pumped in as a liquid during assembly, but hardens to a solid when cured. Some of the epoxy will flow through the wraps of the liner into contact with the laminations 23.

The apparatus for breaking apart the laminations 23 and removing the windings 27 is shown in FIG. 1 and includes a work bench 31. Bench 31 is a table having legs 33. A trough 35 with a "V" shape is secured along one side of bench 31. A stationary clamp 37 is mounted stationarily to trough 35. Clamp 37 comprises two arcuate members for clamping about stator 15, these members being secured by bolts 39.

A movable clamp 41 has a similar construction to clamp 37 and is located on trough 35, also. Clamp 41 is movable along the axis of the trough 35 or stator 15, with respect to the stationary clamp 37. As shown in FIG. 2, the movable clamp 41 has a lower half or arcuate segment 43. An upper half 45 mates with the lower half 43 to clamp the stator 15. The inner surfaces of the halves 43 and 45 are smooth and cylindrical. The lower half 43 has two lateral flanges 47 extending outwardly. The upper half 45 also has flanges 49 extending outwardly on both sides. Bolts 51 extend through holes in the upper flanges 49 to engage threaded apertures in the lower flanges 47. The upper and lower halves 43 and 45 are of the same diameter as stator 15, but are not fully semi-circular, resulting in a gap 53 between the upper and lower halves 43 and 45. This enables the bolts 51 to be tightened to tightly secure the clamp 41 to the stator 15. Each clamp 37 and 41 is about the same length as the distance between the bronze laminations 23.

Referring again to FIG. 1, a chain 55 is secured to the forward end of the movable clamp 41. Chain 55 has both its ends secured to the two upper flanges 47, and its center secured to a movable guide 57. Guide 57 slides along the trough 35, and has lower edges 59 which depend inwardly and downwardly to retain the guide 57 on the trough 35. A pulley 61 is rotatably mounted to the guide 57. A cable 63 has a dead end 65 secured to the forward end of bench 31. Cable 63 extends around pulley 61, with a live end wrapped around a winch 67. A wheel 69 allows the winch 67 to be manually rotated to move the guide 57 and movable clamp 41 axially away from the stationary clamp 37.

To reclaim the laminations of an elongated electric motor 11, the end coils (not shown) of the windings 27 are cut out and removed. The compression load on the stator snap rings (not shown) is released, and the snap rings are removed. Then the stator 15 is removed from the housing 13.

The stator 15 is placed in the trough 35, and its forward end is clamped with the clamps 37 and 41. Clamp 41 will be located at the extreme forward end, with its rearward edge in abutment with the stationary clamp 37. The forward edge of stationary clamp 37 should be approximately flush with the rearward edge of the first section of bronze laminations 23. Then the wheel 69 is rotated to move the movable clamp 41 away from the stationary clamp 37. This force will pull the windings 27 from the section or segment of the stator 15 contained within the movable clamp 41. A section of the laminations 23 will thus break apart from the remaining portions of the stator 15 held by the stationary clamp 37.

The separated section, which is approximately 13 inches in length is then removed from the movable clamp 41 and set aside for further cleaning. The separated section will contain residual epoxy, and the laminations 23 in this separated section will still be stuck together. The portion (not shown) of the windings 27 pulled loose from the separated section will be cut off from the remaining oportion of stator 15.

Then, the stationary clamp 37 is released by loosening bolts 39, and the stator 15 is advanced incrementally forward another 13 inches. The movable clamp 41 is brought back into abutment with the stationary clamp 37 and clamped to the newly exposed section of the stator 15. The remaining portions of stator 15 are again clamped with the stationary clamp 37. Wheel 69 is again rotated to break apart another section from the stator 15. Again, windings contained within the separated section will be pulled loose. The cycle is repeated until the stator 15 is broken into small sections, each section except the last section being free of windings to expose the epoxy within the individual laminations 23.

Then, the residual epoxy can be removed from the laminations by various methods. One method is by placing the separated sections of laminations 23 into a vessel containing a suitable solvent to loosen the epoxy. One type of suitable solvent would have the following constituents: 80% methylene chloride, 10% formic acid, 4% acetic acid, 3.5% toluene and 1% sodium dodecyl benzene sulfonate. After soaking, the separated laminations would be immersed in a neutralizing solution, and they should be ready for reuse. The last section, which still has windings 27, can be separated by soaking in the same solvent, but for a longer duration.

Another method of removing the residual epoxy would be to place the separated sections in an oven at about 750° F. for about four hours, during which time the residual epoxy is reduced to a powder and may be removed with ordinary shop air pressure. The heat will char and crystalize the epoxy.

Another method of removing the residual epoxy is to heat the separated sections in an oven to about 500° F., then quench the hot sections in a cold liquid, such as water. The sudden temperature change and the difference in the coefficient of expansion between the epoxy and the metal laminations serve to break the epoxy loose sufficiently such that it can be removed by brushing and ordinary shop air pressure.

The invention has significant advantages. Clamping and pulling the laminations apart in sections enables the windings to be pulled loose from the separated sections to expose the epoxy for removal by various means. This allows the laminations in epoxy filled stators to be reclaimed. Reclaiming the laminations results in a significant savings.

While the invention has been shown in only a few of its forms, it should be apparent to those skilled in the art, that it is not so limited but is susceptible to various changes without departing from the scope of the invention.

We claim:

1. For an elongated electric motor of the type having a stator stationarily mounted in a housing and composed of laminations having slots containing windings and filled with a liquid filler which hardens to encapsulate the windings, an improved method of reclaiming the laminations for reuse, comprising in combination:
   (a) removing the stator from the housing;
   (b) securing portions of the stator with two grippers, one of which is movable relative to the other;
   (c) moving one of the grippers apart from the other, separating a section of the stator from the remaining portions of the stator and pulling windings from the separated section; then
   (d) resecuring the stator and repeating step (c) to provide a plurality of sections free of windings; and
   (e) removing residual filler from the sections and separating the sections into individual laminations.

2. For an elongated electric motor of the type having a stator stationarily mounted in the housing and composed of laminations having slots containing windings and filled with a liquid filler which hardens to encapsulate the windings, an improved method of reclaiming the laminations for reuse, comprising in combination:
   (a) removing the stator from the housing;
   (b) placing the stator on a support having two clamps, one of which is axially movable relative to the other;
   (c) clamping one end of the stator with the clamps located next to each other and the remaining portion of the stator carried by the support;

(d) moving one of the clamps axially apart from the other, separating a section of the stator from the remaining portions of the stator and pulling windings from the separated section; then (e) releasing the clamps, and moving the stator forwardly to expose another section, reclamping the end of the stator with both clamps and again moving the clamps apart from each other to separate another section of the stator and to pull windings from the second separated section; then (f) repeating step (e) to provide a plurality of separated sections of the stator free of windings; and (g) removing residual filler from the sections and separating the sections into individual laminations.

3. For an elongated electric motor of the type having a stator stationarily mounted in the housing and composed of laminations having slots containing windings and filled with a liquid filler which hardens to encapsulate the windings, an improved method of reclaiming the laminations for reuse, comprising in combination:

(a) removing the stator from the housing;

(b) placing the stator on a support having two clamps, one of which is axially movable relative to the other;

(c) clamping one end of the stator with the clamps located next to each other and the remaining portion of the stator carried by the support;

(d) moving one of the clamps axially apart from the other, separating a section of the stator from the remaining portions of the stator and pulling windings from the separated section; then (e) releasing the clamps, and moving the stator forwardly to expose another section, reclamping the end of the stator with both clamps and again moving the clamps apart from each other to separate another section of the stator and to pull windings from the second separated section; then (f) heating the separated sections at a temperature and for a time sufficient to crystalize the filler; then (g) removing the crystalized filler from the sections and separating the sections into individual laminations.

4. For an elongated electric motor of the type having a stator stationarily mounted in the housing and composed of laminations having slots containing windings and filled with a liquid filler which hardens to encapsulate the windings, an improved method of reclaiming the laminations for reuse, comprising in combination:

(a) removing the stator from the housing;

(b) placing the stator on a support having two clamps, one of which is axially movable relative to the other;

(c) clamping one end of the stator around its outer diameter with the clamps located next to each other and the remaining portion of the stator carried by the support;

(d) moving one of the clamps axially apart from the other, separating a section of the stator from the remaining portions of the stator and pulling windings from the separated section; then (e) releasing the clamps, and moving the stator forwardly to expose another section, reclamping the end of the stator with both clamps and again moving the clamps apart from each other to separate another section of the stator and to pull windings from the second separated section; then (f) repeating step (e) to provide a plurality of separated sections of the stator free of windings; and (g) heating the separated sections, then quenching the sections in a liquid to cause the filler to break loose from the laminations; then (h) removing the filler from the sections and separating the sections into individual laminations.

5. For an elongated electric motor of the type having a stator stationarily mounted in the housing and composed of laminations having slots containing windings and filled with a liquid filler which hardens to encapsulate the windings, an improved method of reclaiming the laminations for reuse, comprising in combination:

(a) removing the stator from the housing;

(b) placing the stator on a support having two clamps, one of which is axially movable relative to the other;

(c) clamping one end of the stator around its outer diameter with the clamps located next to each other and the remaining portion of the stator carried by the support;

(d) moving one of the clamps axially apart from the other, separating a section of the stator from the remaining portions of the stator and pulling windings from the separated section; then (e) releasing the clamps, and moving the stator forwardly to expose another section, reclamping the end of the stator with both clamps and again moving the clamps apart from each other to separate another section of the stator and to pull windings from the second separated section; then (f) repeating step (e) until the stator is substantially separated into sections free of windings; and (g) placing the separated sections into a solvent for loosening the filler; then (h) removing the filler from the sections and separating the sections into individual laminations.

* * * * *